(12) United States Patent
Prell et al.

(10) Patent No.: US 10,889,739 B2
(45) Date of Patent: Jan. 12, 2021

(54) SEALANT MATERIAL

(71) Applicant: Henkel IP & Holding GmbH, Duesseldorf (DE)

(72) Inventors: Anna Prell, Heidelberg (DE); Eadaoin Ledwidge, Dublin (DE)

(73) Assignee: Henkel IP & Holding GmbH, Duesseldorf (DE)

( * ) Notice: Subject to any disclaimer, the term of this patent is extended or adjusted under 35 U.S.C. 154(b) by 31 days.

(21) Appl. No.: 15/643,749

(22) Filed: Jul. 7, 2017

(65) Prior Publication Data

US 2017/0306202 A1 Oct. 26, 2017

Related U.S. Application Data

(63) Continuation of application No. PCT/EP2015/080672, filed on Dec. 18, 2015.

(30) Foreign Application Priority Data

Jan. 16, 2015 (GB) .................................... 1500753.7

(51) Int. Cl.
*C09K 3/10* (2006.01)
*F16L 15/04* (2006.01)

(52) U.S. Cl.
CPC .......... *C09K 3/1012* (2013.01); *C09K 3/1018* (2013.01); *C09K 3/1028* (2013.01); *F16L 15/04* (2013.01); *C09K 2003/1078* (2013.01); *C09K 2200/0447* (2013.01); *C09K 2200/0625* (2013.01); *C09K 2200/0682* (2013.01);
(Continued)

(58) Field of Classification Search
CPC .... C09K 2003/1078; C09K 2200/0447; C09K 2200/0625; C09K 2200/0682; C09K 2200/0685; C09K 2200/0692; C09K 3/1012; C09K 3/1018; C09K 3/1058; F16L 15/04
See application file for complete search history.

(56) References Cited

U.S. PATENT DOCUMENTS

| 2,550,944 A | 5/1951 | Stack |
| 2,929,541 A | 3/1960 | Castelli et al. |

(Continued)

FOREIGN PATENT DOCUMENTS

| CN | 1092459 | 10/2002 |
| CN | 1127774 | 11/2003 |

(Continued)

OTHER PUBLICATIONS https://eurofibers.com/pps/ no date.*

(Continued)

*Primary Examiner* — Arti Singh-Pandey
(74) *Attorney, Agent, or Firm* — Steven C. Bauman

(57) ABSTRACT

A sealant material for sealing threaded pipe joints that is a multifilament or spun polyphenylene sulfide yarn and a joint sealing composition comprising a silicone oil or a natural oil with a smoke point of about 230° C. or higher. The polyphenylene sulfide yarn is coated with the joint sealant composition. The material forms an effective seal and is resistant even when used in systems in which it is exposed to temperatures in excess of 280° C. The material may be provided in a dispenser.

11 Claims, 1 Drawing Sheet

(52) U.S. Cl.
CPC ............... *C09K 2200/0685* (2013.01); *C09K 2200/0692* (2013.01)

(56) References Cited

U.S. PATENT DOCUMENTS

| | | |
|---|---|---|
| 3,587,840 A | 6/1971 | Hultberg |
| 3,612,427 A | 10/1971 | Bishop et al. |
| 4,502,364 A | 3/1985 | Zucker et al. |
| 4,582,196 A | 4/1986 | Hughson |
| 4,606,134 A | 8/1986 | Flick |
| 4,796,783 A | 1/1989 | Paulson |
| 4,844,373 A | 4/1989 | Fike, Sr. |
| 4,934,523 A | 6/1990 | Strom |
| 4,958,733 A | 9/1990 | Masuda |
| 4,994,303 A | 2/1991 | Calkins |
| 5,068,265 A | 11/1991 | Casey et al. |
| 5,172,841 A | 12/1992 | Friedman |
| 5,263,585 A | 11/1993 | Lawhon |
| 5,282,563 A | 2/1994 | Oliver et al. |
| 5,299,723 A | 4/1994 | Hempel |
| 5,398,975 A | 3/1995 | Simmons |
| 5,407,071 A | 4/1995 | Lawhon |
| 5,490,722 A | 2/1996 | Sonnett et al. |
| 5,560,377 A | 10/1996 | Donovan |
| 5,606,134 A | 2/1997 | Strieber |
| 5,607,050 A | 3/1997 | Dolan et al. |
| 5,649,659 A | 7/1997 | Saunders |
| 5,765,740 A | 6/1998 | Ferguson |
| 5,806,666 A | 9/1998 | Chiang et al. |
| 6,034,002 A | 3/2000 | Maderek |
| 6,051,314 A | 4/2000 | Girgis |
| 6,078,824 A | 6/2000 | Sogo |
| 6,012,050 A | 8/2000 | Marcon |
| 6,713,217 B2 | 3/2004 | Oura et al. |
| 2001/0044486 A1 | 11/2001 | Wesch |
| 2002/0190481 A1 | 12/2002 | Casey et al. |
| 2004/0036287 A1 | 2/2004 | Trivelli |
| 2006/0276349 A1 | 12/2006 | Scholer et al. |

FOREIGN PATENT DOCUMENTS

| | | |
|---|---|---|
| DE | 254915 | 1/1989 |
| DE | 102009046200 | 5/2011 |
| EP | 0010293 | 4/1980 |
| EP | 0 282 284 | 9/1988 |
| EP | 0399682 | 11/1990 |
| EP | 0646672 | 4/1995 |
| EP | 1122202 | 8/2001 |
| EP | 1 647 511 | 9/2007 |
| JP | S5228548 | 3/1977 |
| JP | 2006233398 | 9/2006 |
| JP | 2007016173 | 1/2007 |
| WO | 9616800 | 6/1996 |
| WO | 98/47805 | 10/1998 |
| WO | 01/36537 | 5/2001 |
| WO | 0153424 | 7/2001 |

OTHER PUBLICATIONS https://patents.google.com/patent/CN1252773A/en?oq=CN1252773 (Year: 1997).*
https://patents.google.com/patent/EP0282284A1/en?oq=EP0282284 (Year: 1992).*
International Search Report issued in connection with International Patent Application No. PCT/EP2015/080672 dated Mar. 31, 2016.

* cited by examiner

SEALANT MATERIAL

BACKGROUND

Field

The present invention relates to sealant material. Of interest are sealant materials useful for sealing joints. Joints to be sealed include those joining conduits for fluids. For example the joints may be pipe joints. The invention is useful in the plumbing industry. Of particular interest are materials for sealing threaded pipe joints.

Brief Description of Related Technology

Materials for sealing pipe joints are well-known. For example International Patent Publication No. WO 98/47805 describes a yarn material which is impregnated with a coating material. LOCTITE® 55 is a product sold based on the technology disclosed therein. While such materials are very useful, and LOCTITE® 55 has been and continues to be quite successful commercially, there are applications and/or environmental conditions where performance improvements could be advantageous.

German Patent Publication DD 254915 describes a sealant for pipe joints using rubber coatings. EP 1 647 511 describes a wire with a polymer core which is coated with cross-linked silicone rubber. Japanese Patent Publication JP2007016173 describes a rotary joint sealant which is a matrix resin including fibres. U.S. Pat. No. 4,502,364 describes a composite fibre packing material. International Patent Publication WO 01/36537 describes a curable silicone composition. European Patent Publication EP 0 399 682 also describes a curable siloxane sealant. U.S. Patent Publication No. 2001/0044486 describes plastisol compositions. Chinese Patent Publication 1127774 describes a sealing material for communication joints. Chinese Patent Publication 1092459 describes a sealing material. Japanese Patent Publication JPS5228548 describes a caulking material.

European Patent Publication EP 1 122 202 describes a winding device for winding a pipe sealant onto a pipe. U.S. Pat. No. 5,172,841 describes a cord dispensing apparatus. U.S. Pat. No. 4,606,134 describes a striking line dispenser.

SUMMARY

In one aspect, the present invention provides a sealant material for sealing joints comprising:

a multifilament or spun polyphenylene sulfide yarn; and a joint sealing composition comprising a silicone oil or a natural oil with a smoke point of about 230° C. or higher, the polyphenylene sulfide yarn being coated with the joint sealant composition.

Surprisingly it has been found that such sealant materials can easily seal joints such as pipe joints and resist high temperature exposure.

The term "natural oil" when used in the present invention means an oil extracted from natural sources and does not include petroleum oils. Suitable natural oils include those derived from plants which includes seed, fruit and plant extracts.

Within the present invention the smoke point is the smoke point as measured according to standard method AOCS Cc 9a-48 (from the American Oil Chemists' Society,) for testing inter alia smoke points.

The silicone oil is selected from polydimethylsiloxane terminated with methyl and/or have phenyl substitutions. Indeed any polydimethylsiloxane with high temperature resistance is of interest.

The natural oil is desirably selected from avocado oil, safflower oil, rice bran oil, soya bean oil and sesame oil. Such natural oils can be used in plumbing joints, for example potable water plumbing systems.

The joint sealant composition can have an amount from about 20 to about 40% w/w sealing composition on from about 60 to about 80% w/w yarn.

Desirably the joint sealing composition comprises a natural oil or sustainable oil with a high smoke point. The use of natural oils is preferred as they surprisingly show resistance at high temperatures yet they are not toxic.

Desirably the yarn is a polyphenylene sulfide spun yarn and the joint sealing composition comprises a silicone oil as this combination in particular provides good results when tested.

It will be appreciated that all of the joint sealing compositions of the present invention are non-curable compositions. Furthermore it will be appreciated that all of the joint sealing compositions of the present invention do not have fibres dispersed within a carrier such as a resin. All of the compositions of the invention are multifilament or spun yarns to which a joint sealing composition is applied.

The invention also includes an article of manufacture comprising a sealant material according to any preceding claim packaged in a dispenser from which the sealant material can be supplied for direct application to a joint to be sealed.

Even when the smoke point is high, for example about 230° C. or higher it has been surprisingly found that the joints sealed with the sealant material of the invention can withstand temperatures of up to 280° C. and higher. Even at such temperatures the oil does not smoke even though it would be expected to smoke at temperatures which exceed the smoke point.

The invention thus provides effective sealants of joints which can withstand high temperatures, for example about 230° C. and higher, for example 280° C. and higher and remain intact without leaking.

Desirably the sealing composition is in the form of a paste to allow for ease of handling.

Some desirable properties of the invention include:

instant seal;

joint can be re-adjusted up to at least 45 degrees and in some cases up to 360 degrees; and temperature resistance of 280° C.

Using a paste based on natural high smoke point oil offers the advantage of use in sealing applications which cannot use other oils such as mineral oils, for example silicone oils. For example paint and body repair shops cannot use silicone based products onsite.

Using yarn spun polyphenylene sulfide with paste based on silicone oils gives a product which does not cause environmental stress cracking (ESC) on polyphenylsulfone (PPSU) pipe fittings.

Other potential components of a composition of the invention include one or more selected from inert fillers such as calcium carbonate, talc, rheology modifiers where required (for example organoclays), and polymeric fillers such as polytetrafluoroethylene (PTFE) or polymethylmethacrylate (PMMA). Where PMMA is used it is desirably in the form of microbeads.

DETAILED DESCRIPTION

Sealant materials according to the present invention were prepared as set out in the following Experimental section.
Experimental
The materials used were as follows:

| Name | Material/Composition |
| --- | --- |
| Yarn 1 | polyphenylene sulfide multifilament yarn |
| Yarn 2 | polyphenylene sulfide spun yarn |
| Coating a1 | 28% Methyl terminated PDMS |
| | 5% talcum |
| | 64% Calcium Carbonate (inorganic filler) |
| | 3% PMMA microbeads (polymeric filler for reworkability and sealing) |
| Coating b1 | 24% avocado oil |
| | 68% Calcium Carbonate (inorganic filler) |
| | 5% talcum |
| | 3% PMMA microbeads (polymeric filler for reworkability and sealing) |
| Coating a2 | 28% Methyl terminated PDMS |
| | 5% talcum |
| | 64% Calcium Carbonate (inorganic filler) |
| | 1.5% PMMA microbeads (polymeric filler for reworkability and sealing) |
| | 1.5% PTFE (polymeric filler) |
| Coating b2 | 24% avocado oil |
| | 68% Calcium Carbonate (inorganic filler) |
| | 5% talcum |
| | 1.5% PMMA microbeads (polymeric filler for reworkability and sealing) |
| | 1.5% PTFE (polymeric filler) |

Two yarns of type Yarn 1 were combined together by placing them side-by-side and drawing them through a batch of paste. (The paste was used to hold them together as they were not twisted or spliced together in anyway.) Two yarns of type Yarn 2 were also combined together in the same way by placing them side-by-side and drawing them through a batch of paste.

The paste used in each instance is identified as a1, a2, b1 or b2 in the table above and the components of each paste are listed in that table also. The Yarns are also identified in the table above.

The emerging wet yarn was wound off onto rolls until a weight of approx 0.5-0.8 g/m of yarn was achieved.

Figure 1:
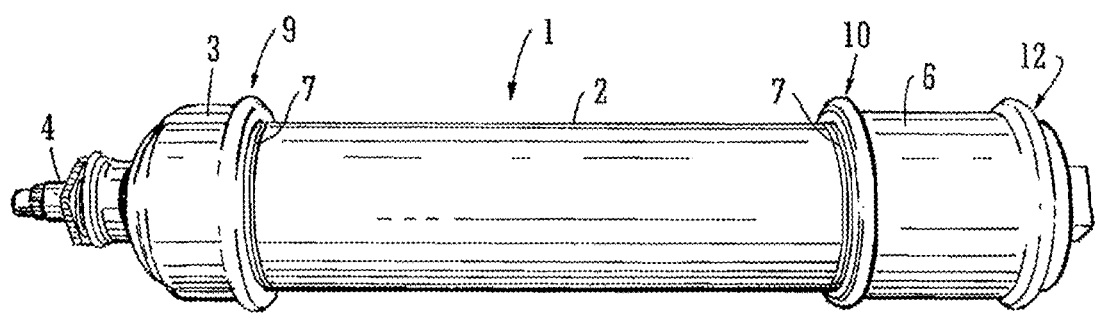
FIG. 1 is a drawing of a test assembly used in the Experimental section below.

Testing was performed on assemblies made using new (unused) pipes and fittings cut according to EN 10242 having no visible defects. Recommended test parts are ISO 7-1 quality (and parts of this quality were used). The test assembly 1 used is shown in FIG. 1 below and consists of a pressure connection 4, a 1.5"-0.5" (3.8-1.3 cm) reducer, and an equal barrel nipple 3, a 1.5" (3.8 cm) socket and a 1.5" (3.8 cm) stopper. Sockets employed generally have parallel threads and tapered stoppers.

Figure 2:
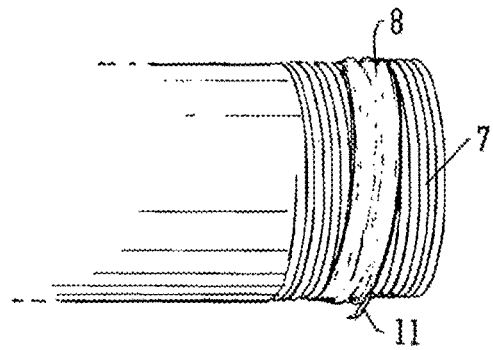
FIG. 2 is a drawing of a threaded pipe joint with the sealant material applied thereto as described in the Experimental section below.

The male threads 7 were roughened using a metal saw. The male and female threads 7 were cleaned using a steel brush. The product was applied to the male threads 7 of the test joints 9,10,12. One thread 11 was left in a visible position to allow assembly into the sockets. Five winds of the product were applied to the next thread and wound back over five threads, then wound forward to the start, and back again, applying in a "criss-cross" fashion as shown in FIG. 2 below. The thread was cut off and the trailing end of the product tucked into the nipple or stopper so that it is not hanging loose.

The test pieces were assembled as shown in FIG. 1 using a torque wrench to apply an input torque of 150 Nm. Excess product was removed using a steel brush. The samples were allowed to cool to room temperature before testing. (Heat may be produced due to friction.)

The parts and in particular the joints were then tested according to Standard EN751-2 Screening Test as follows.

An appropriate connector was attached to the open end of the test assembly and connected to an air pressure source.

The test assembly was pressurised to 7.5±3 bar (0.75 MPa±0.3 MPa) with air or nitrogen.

The assembly was immersed in a water bath (room temperature) and inspected for leakage. Leakage is determined by the appearance of bubbles during the immersion period, ignoring those noted during the first 15 seconds of immersion.

Joints 9 and 10 (see FIG. 1) were turned back by 45° and the assembly was again immersed and tested again as described above.
Environmental Resistance Tests Once tested as above for instant seal, test assembles were filled with water, stoppered (at the pressure connector joint) and stored at quoted temperatures and corresponding pressures for 1 week. The stopper is then removed, test pieces were emptied, and joints were tested again as above.

| Yarn | Coating | Instant Seal | Reworkability as defined by EN 752-1 | Resistance to Steam at 200 deg C., pressure of 17 bar (1.7 MPa) | Resistance to Steam at 250 deg C., pressure of 40 bar (4.0 MPa) | Resistance to Steam at 280 deg C., pressure of 65 bar (6.5 MPa) |
| --- | --- | --- | --- | --- | --- | --- |
| 1 | (a1) | √ | √ | √ | √ | √ |
| 1 | (a2) | √ | √ | √ | √ | √ |
| 1 | (b1) | √ | √ | √ | √ | — |
| 1 | (b2) | √ | √ | √ | √ | √ |
| 2 | (a1) | √ | √ | √ | √ | √ |
| 2 | (a2) | √ | √ | √ | √ | √ |
| 2 | (b1) | √ | √ | √ | √ | √ |
| 2 | (b2) | √ | √ | √ | √ | √ |

The main difference between coating a1 and b1 respectively and a2 and b2 respectively is that avocado oil was used instead of PDMS.

For comparison, the below table shows results based on using the same formulations except for using polyamide yarns with the above coatings:

| Yarn | Coating | Instant Seal | Resistance to Steam at 250 deg C. | Resistance to Steam at 280 deg C. |
| --- | --- | --- | --- | --- |
| PA 4,6 | (b2) | √ | X | X |
| PA 6,6 | (a2) | √ | X | X |
| PA 6,6 | (b2) | √ | X | X |
| Loctite 55 | | √ | X | X |

PA 4,6=polyamide 4,6; PA 6,6=polyamide 6,6. LOCTITE® 55 is a pipe sealant material; it is a coated nylon thread sealant product 4 where the coating is a paste made from hydroxy terminated polydimethylsiloxane with inert fillers including calcium carbonate, talc, and polytetrafluoroethylene. Based on the comparative results in the table above it is expected that using PA 4,6 and PA 6,6 with compositions a1 and b1 would also fail as seals formed using the a2 and b2 compositions were found to perform better than those formed using the a1 and b1 compositions respectively.

It is clear from the foregoing experimental work that the sealant materials of the present invention clearly provide advantages compared to other compositions and have been carefully formulated for optimum properties.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A sealant material for sealing joints consisting of: (a) a multifilament or spun yarn constructed from polyphenylene sulfide; and (b) a joint sealing composition comprising at least one of a silicone oil or a natural oil with a smoke point of about 230° C. or higher, wherein the polyphenylene sulfide yarn is coated with the joint sealant composition in an amount from about 20 to about 40%, w/w on from about 60 to about 80% w/w yarn.

2. A sealant material according to claim 1 wherein the silicone oil is selected from polydimethylsiloxane terminated with methyl or substituted with phenyl groups.

3. A sealant material according to claim 1 wherein the natural oil is selected from at least one of avocado oil, safflower oil, rice bran oil, soya bean oil and sesame oil.

4. A sealant material according to claim 1 wherein the yarn is a polyphenylene sulfide spun yarn and the joint sealing composition comprises a silicone oil.

5. An article of manufacture comprising a sealant material according to claim 1 packaged in a dispenser from which the sealant material can be supplied for direct application to a joint to be sealed.

6. A sealant material for sealing joints consisting of: (a) a multifilament or spun yarn; and (b) a joint sealing composition comprising a natural oil, wherein the natural oil is selected from at least one of avocado oil, safflower oil, rice bran oil, soya bean oil and sesame oil.

7. A sealant material for sealing joints consisting of: (a) a polyphenylene sulfide spun yarn; and (b) a joint sealing composition comprising methyl terminated polydimethylsiloxane.

8. A sealant material according to claim 7 wherein the joint sealing composition comprises by weight about 50 to 80% inert filler.

9. A sealant material according to claim 7 wherein the joint sealing composition comprises a combination of talcum, calcium carbonate, and poly (methyl methacrylate) microbeads.

10. A sealant material according to claim 7 wherein the joint sealing composition comprises by weight about 20 to 40% methyl terminated polydimethylsiloxane.

11. A sealant material for sealing joints consisting of: (a) a multifilament or spun yarn constructed from polyphenylene sulfide; and (b) a joint sealing composition comprising at least one of a silicone oil or a natural oil with a smoke point of about 2300 C or higher, wherein the polyphenylene sulfide yarn is coated with the joint sealant composition, wherein the silicone oil is methyl terminated polydimethylsiloxane and the natural oil is selected from at least one of avocado oil, safflower oil, rice bran oil, soya bean oil and sesame oil.

* * * * *

UNITED STATES PATENT AND TRADEMARK OFFICE
CERTIFICATE OF CORRECTION

PATENT NO. : 10,889,739 B2
APPLICATION NO. : 15/643749
DATED : January 12, 2021
INVENTOR(S) : Anna Prell and Eadaoin Ledwidge Page 1 of 1

It is certified that error appears in the above-identified patent and that said Letters Patent is hereby corrected as shown below:

In the Claims

Column 6, Line 17 Claim 8 change "50 to 80% inert filler" to --60 to 80% inert filler--.

Column 6, Line 30 Claim 11 change "about 2300 C or higher" to --about 230° C. or higher--.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*